Figure 1:
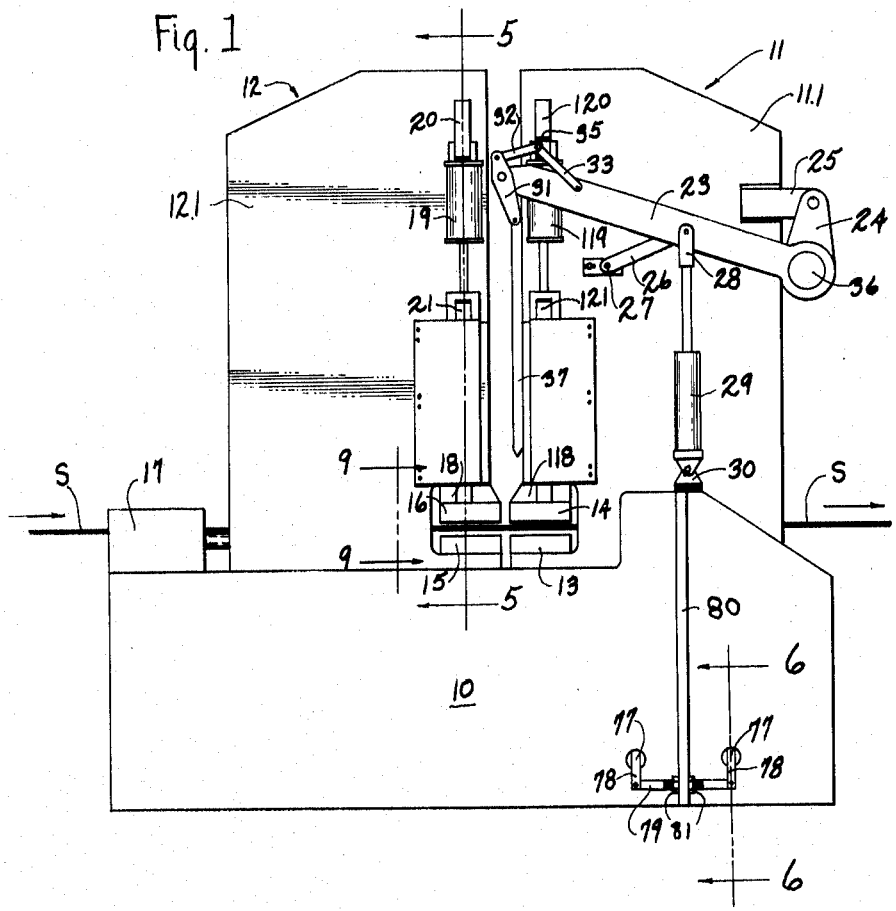

June 21, 1966 A. L. WILLIAMS ETAL 3,257,060
APPARATUS FOR WELDING METAL STRIP
Filed March 1, 1963 10 Sheets-Sheet 1

INVENTORS
ARTHUR L. WILLIAMS
and RICHARD N. KARL
By Williams and Kreske
ATTORNEYS INVENTORS
ARTHUR L. WILLIAMS
and RICHARD N. KARL
By Williams and Kraske
ATTORNEYS

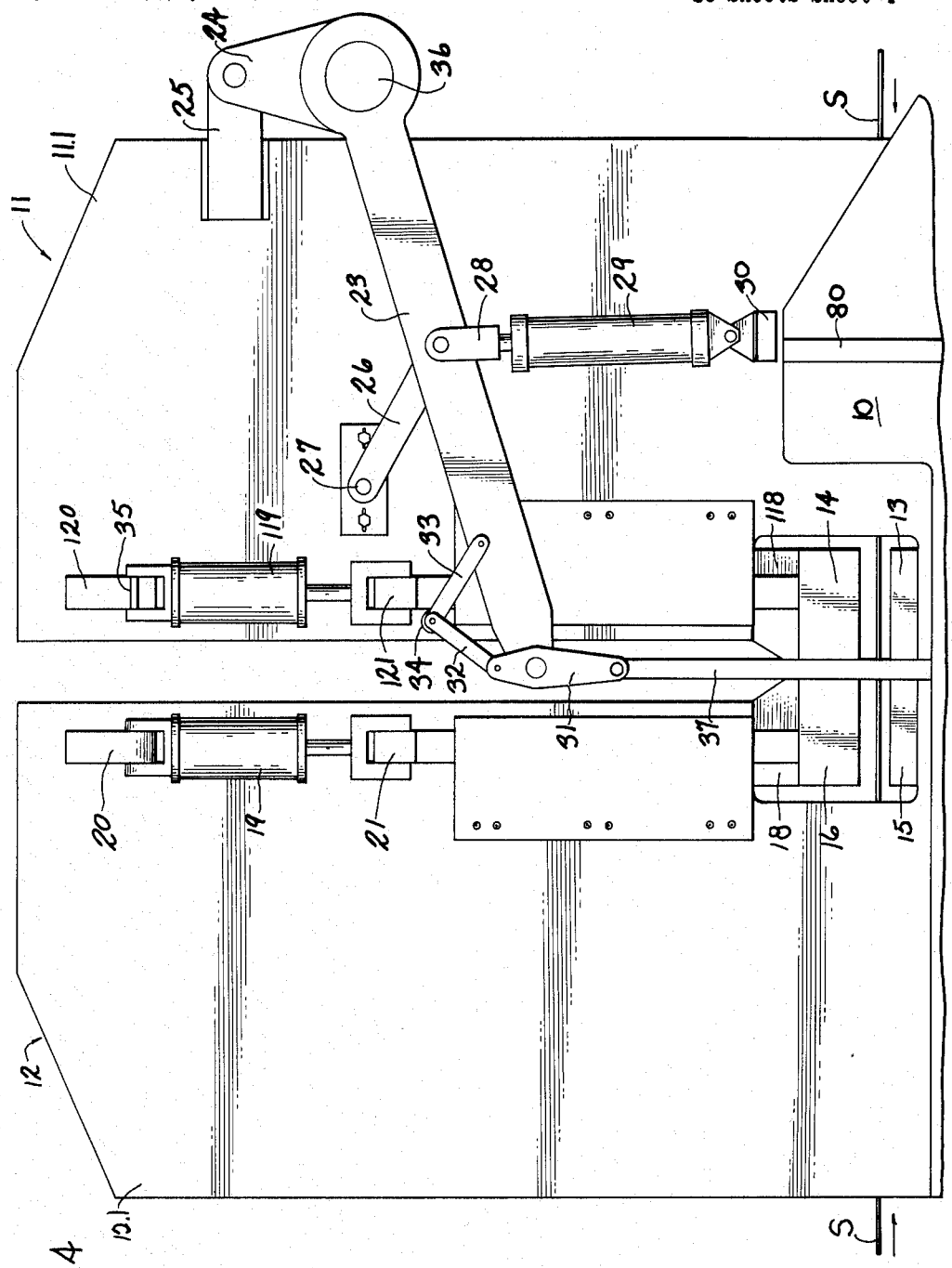

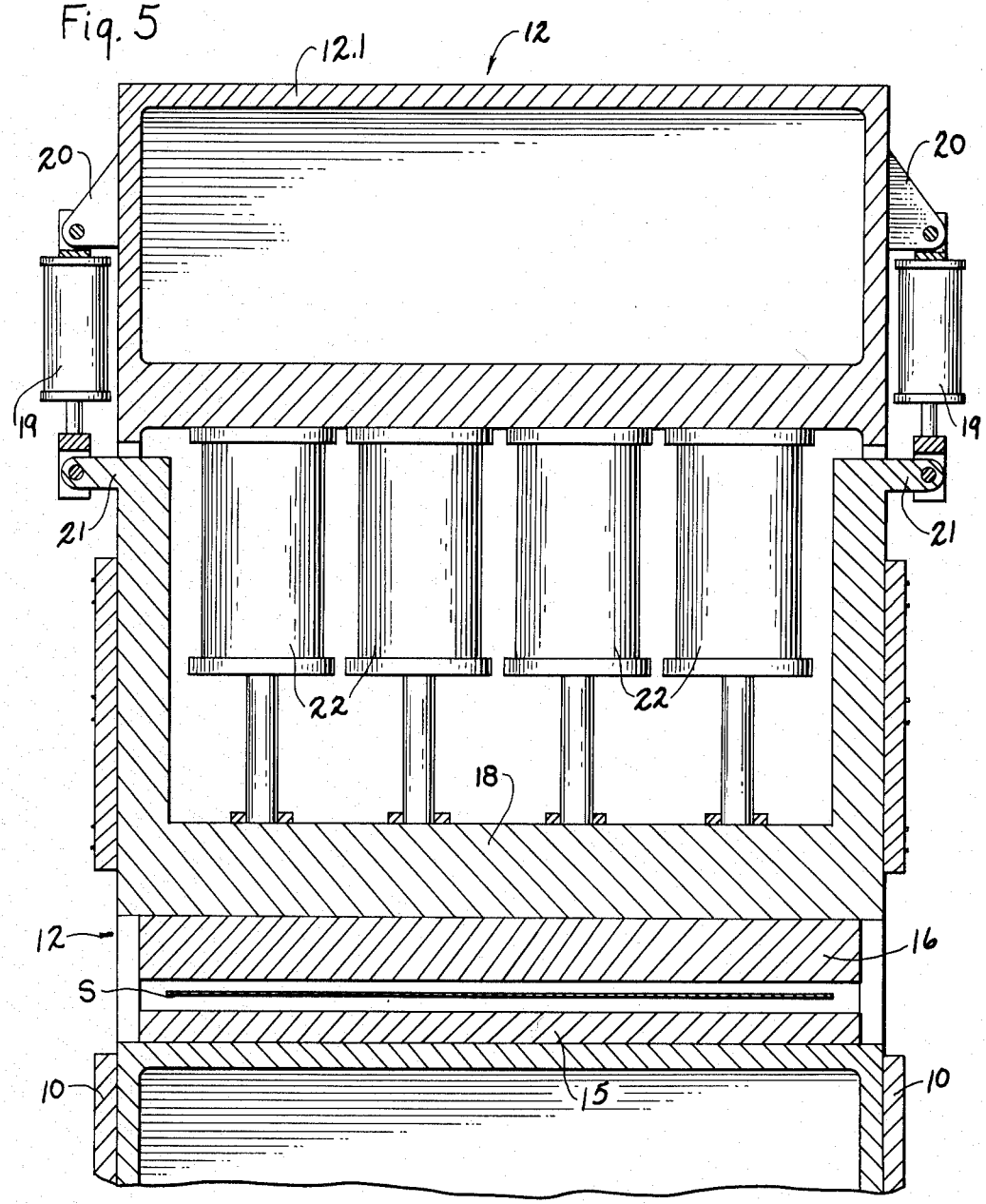

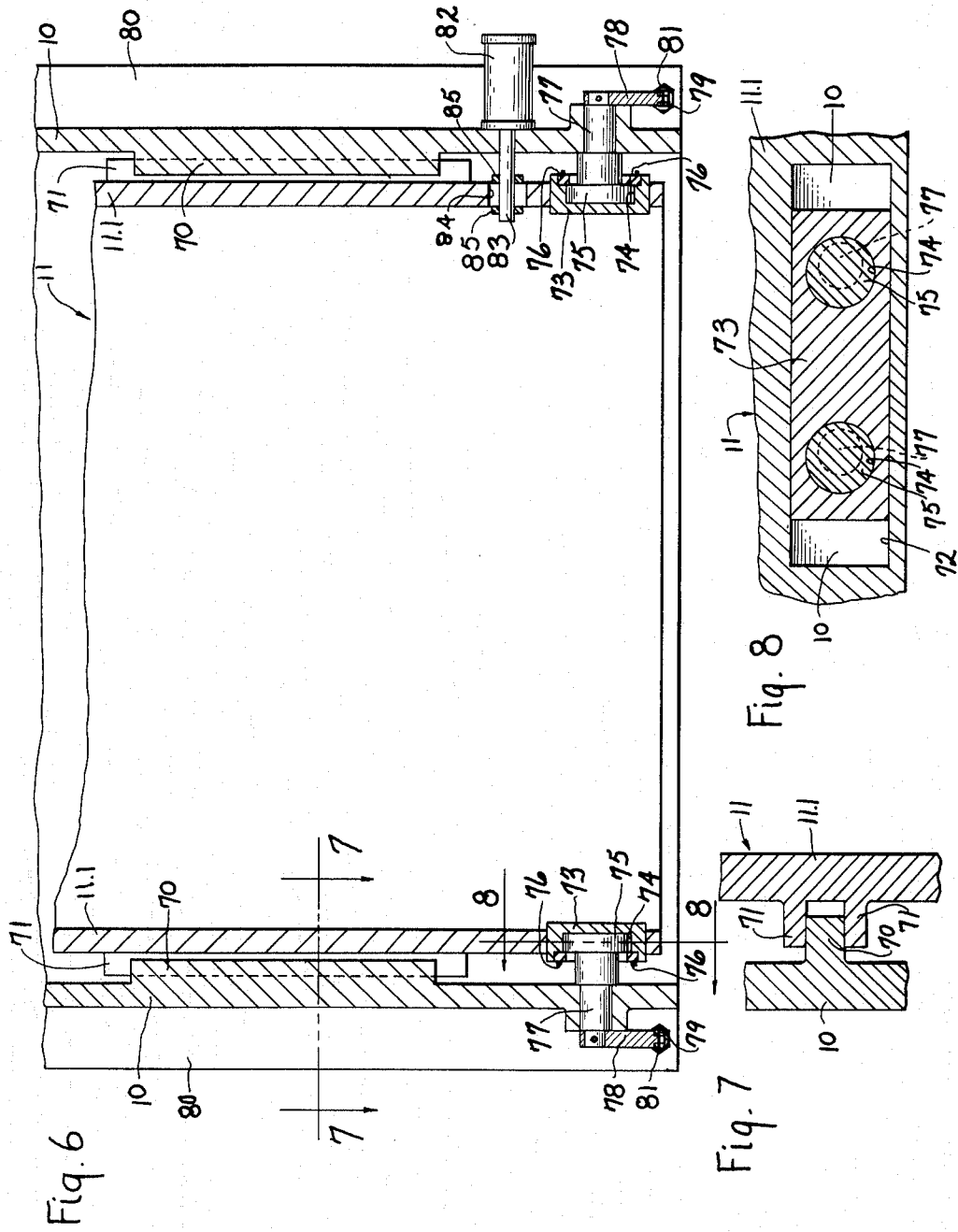

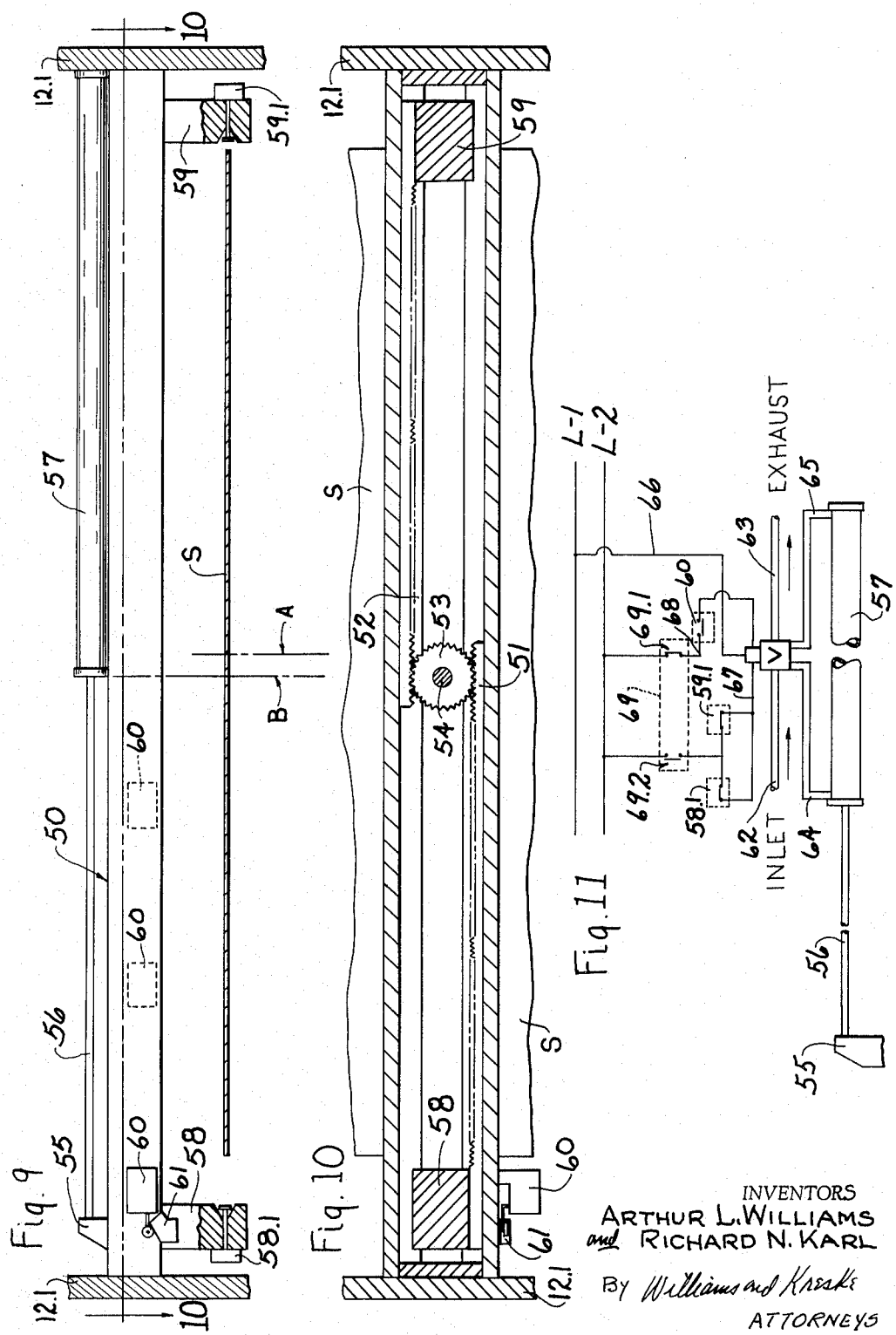

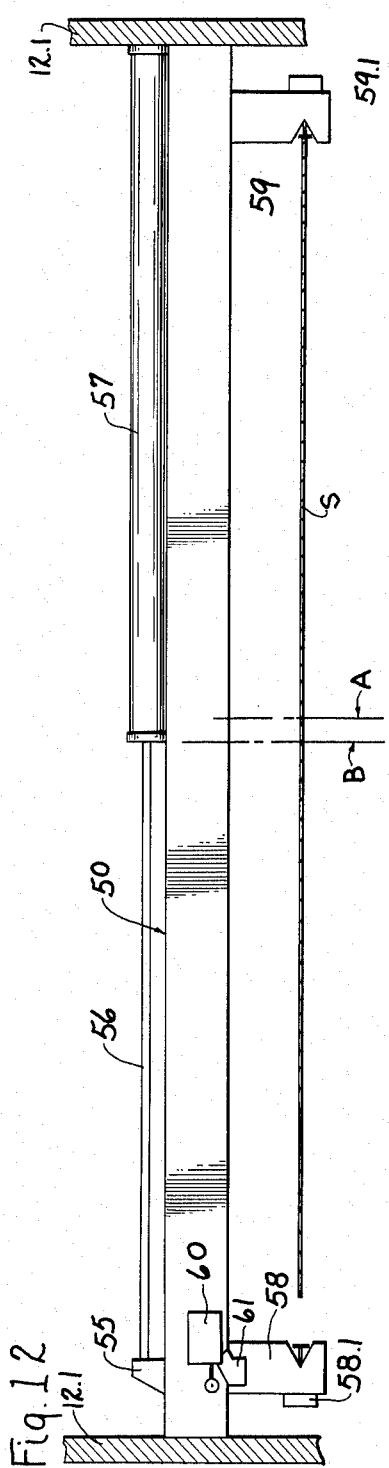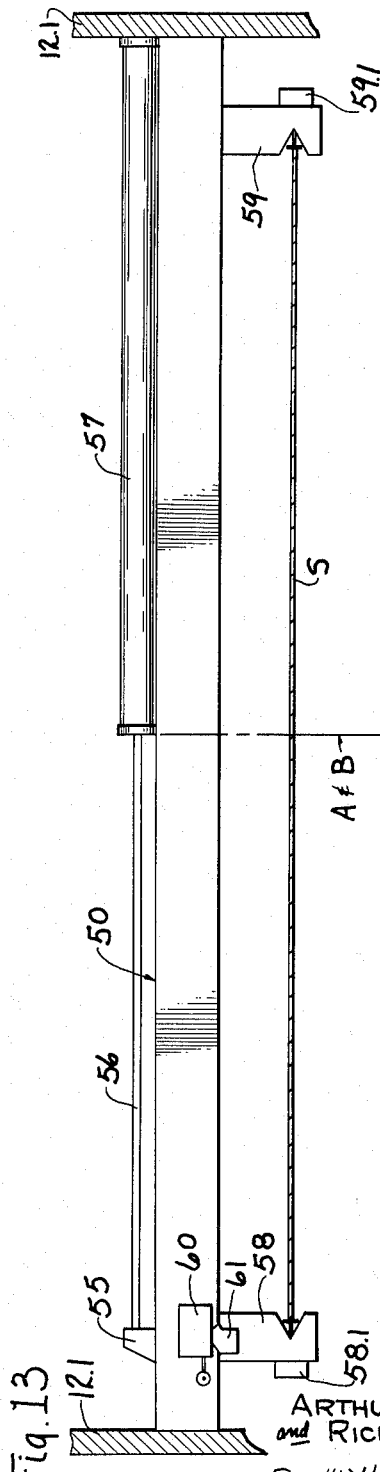

INVENTORS
ARTHUR L. WILLIAMS
and RICHARD N. KARL
By Williams and Kusake
ATTORNEYS June 21, 1966  A. L. WILLIAMS ETAL  3,257,060
APPARATUS FOR WELDING METAL STRIP
Filed March 1, 1963  10 Sheets-Sheet 10

INVENTORS
ARTHUR L. WILLIAMS
and RICHARD N. KARL
BY Williams and Kreske
ATTORNEYS United States Patent Office 3,257,060
Patented June 21, 1966

3,257,060
APPARATUS FOR WELDING METAL STRIP
Arthur L. Williams, Warren, and Richard N. Karl, Cortland, Ohio, assignors to Federal-Warco Division, The McKay Machine Company, Warren, Ohio
Filed Mar. 1, 1963, Ser. No. 261,965
16 Claims. (Cl. 228—4)

The present invention relates to the welding of metal strip ends together in end-to-end relation and the principal object of the invention is to provide new and improved methods and apparatus of the character described.

Many modern strip processing lines require the feeding of strip thereto in unbroken lengths; however, since strip is only available in finite lengths, such strip lengths must be secured together in end-to-end relation. Because of the heavy gauge strip designed to be welded by the present invention, it is necessary to butt-weld the strip ends together rather than to lap-weld them together since the latter type of welding would result in such a thick line of juncture between respective strips as would interfere with strip passage through the processing line. Accordingly, the apparatus herein to be disclosed is of the butt-welding type.

While apparatus for butt-welding metal strip ends together in end-to-end relation is not broadly new, improved structure is presently employed to insure proper spacing of the strip ends as a prerequisite to welding, proper alignment of the strip ends with each other, and higher speed of operation with less complexity and at lower cost. These and other advantages will readily become apparent from a study of the following description and from the drawings appended hereto.

Figure 2:
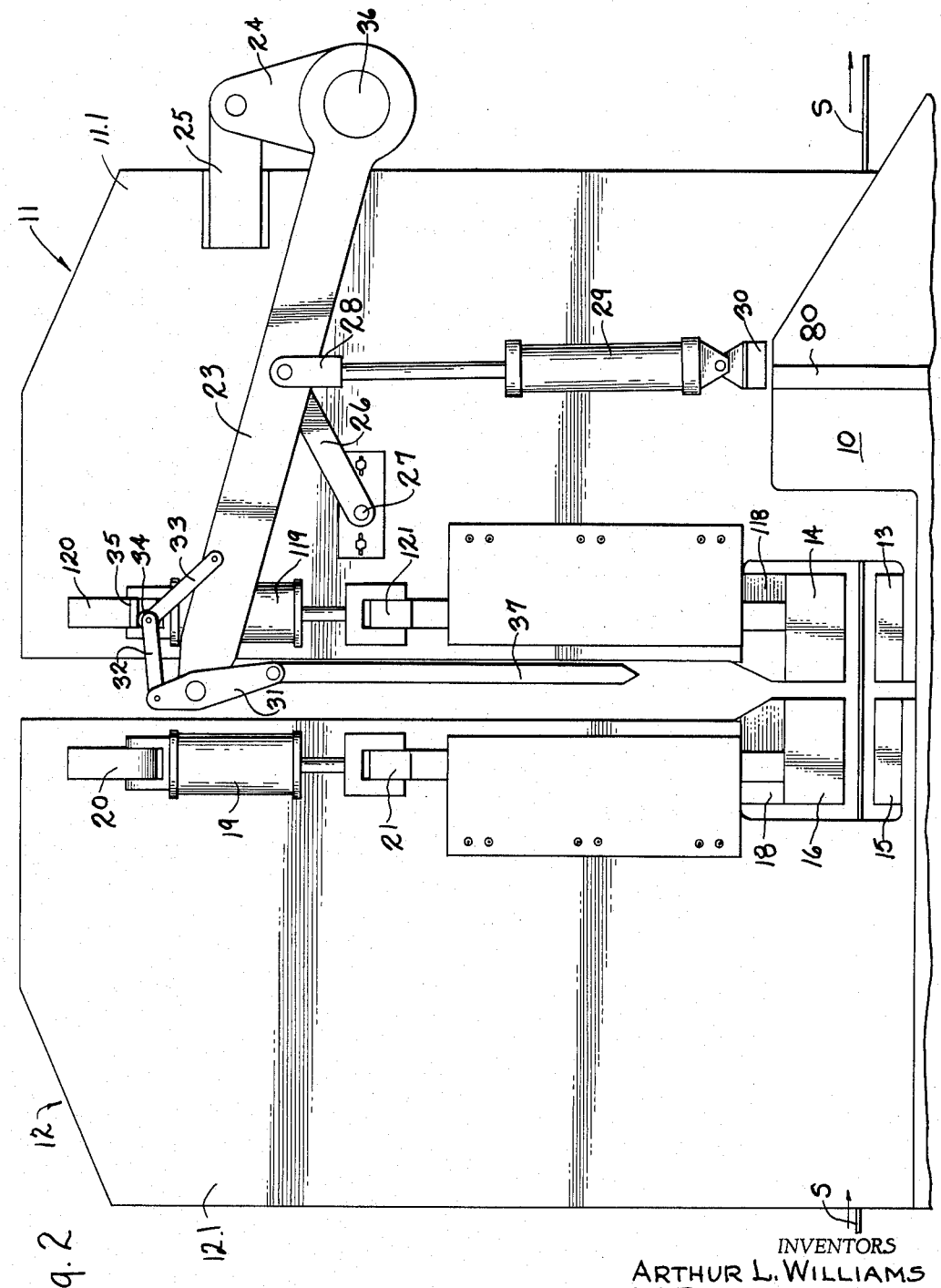
Figure 3:
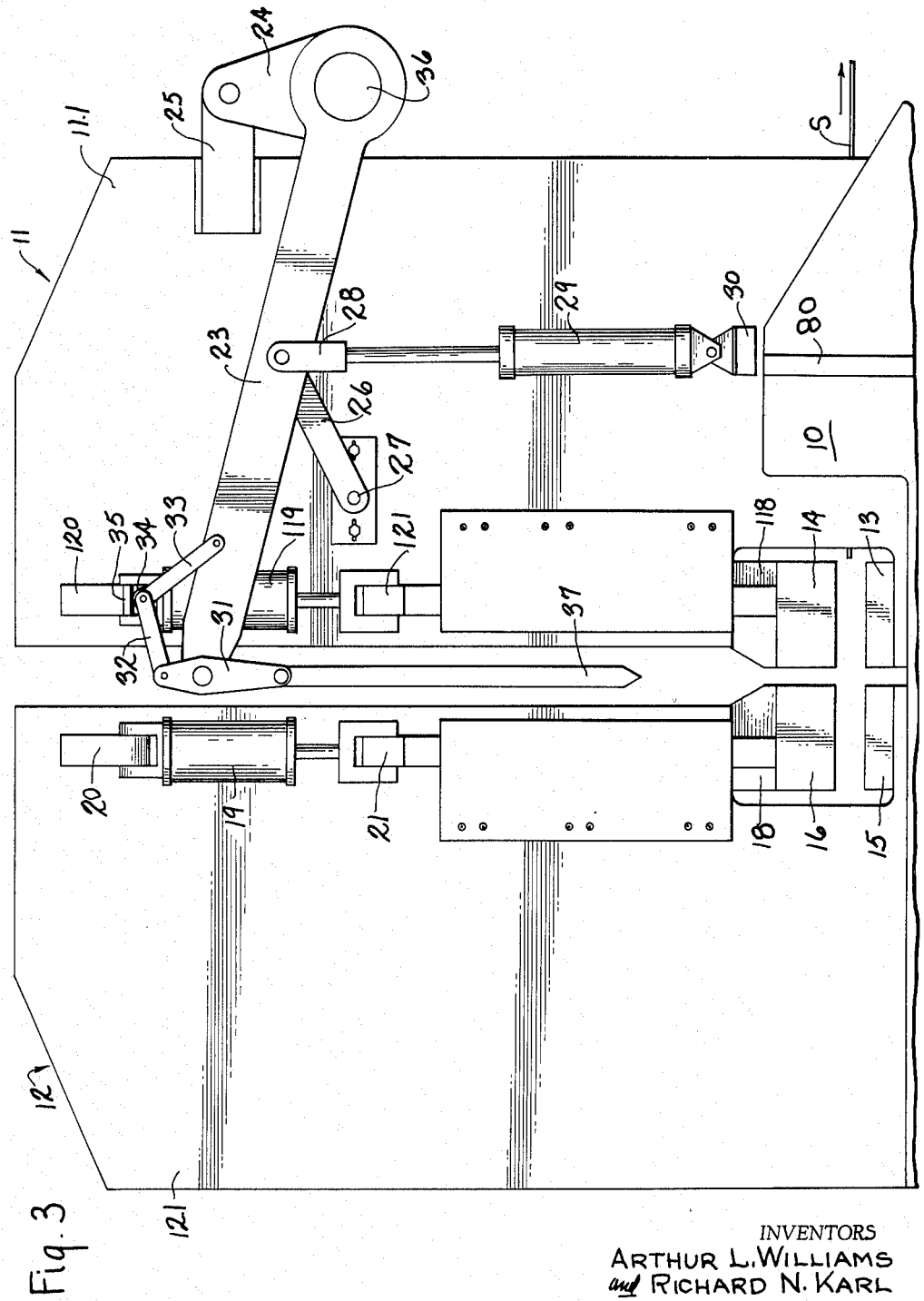

In the drawings accompanying this specification and forming a part of this application there is shown, for purpose of illustration, and embodiment which the invention may assume, and in these drawings:

FIGURE 1 is a side elevational view of apparatus embodying the present invention, FIGURE 2 is a fragmentary view similar to FIGURE 1 but to a larger scale, FIGURES 3 and 4 are views similar to FIGURE 2 but showing certain parts in other positions, FIGURE 5 is a sectional view generally corresponding to the line 5—5 of FIGURE 1, FIGURE 6 is an enlarged fragmentary sectional view generally corresponding to the line 6—6 of FIGURE 1, FIGURE 7 is a fragmentary sectional view generally corresponding to the line 7—7 of FIGURE 6, FIGURE 8 is a fragmentary sectional view generally corresponding to the line 8—8 of FIGURE 6, FIGURE 9 is a fragmentary, enlarged sectional view generally corresponding to the line 9—9 of FIGURE 1, FIGURE 10 is a fragmentary sectional view generally corresponding to the line 10—10 of FIGURE 9, FIGURE 11 is a diagrammatic view showing power and control circuits for effecting operation of the apparatus seen in FIGURE 9, FIGURES 12 and 13 are views similar to FIGURE 9 but showing certain parts in other positions, and FIGURES 14, 15, 16 and 17 are fragmentary diagrammatic views showing the power circuitry for effecting operation of certain parts best illustrated in FIGURE 5.

With reference to FIGURE 1, the apparatus chosen to illustrate the present invention is normally positioned at the entry end of a strip processing line which normally includes an uncoiler (not shown) for supporting a coil of strip while the latter is unwound from the coil and fed into the remainder of the line. The present apparatus is adapted to be interposed between such uncoiler and the remainder of the line, the strip S passing from the uncoiler, through the present apparatus in the direction of the arrow, and thence to the remainder of the strip processing line.

In brief, the apparatus herein disclosed comprises a base 10 which supports upstanding carriage assemblies 11 and 12 in part formed of spaced side walls 11.1, 12.1 respectively. Each carriage assembly has vertically spaced strip clamping jaws extending edgewise of the strip, carriage 11 having a lower jaw 13 and an upper jaw 14 while carriage 12 has a lower jaw 15 and an upper jaw 16. In the position of parts shown, both of the upper jaws are separated from the lower jaws to permit free passage of the strip therebetween; however, as will later appear, the upper jaws are movable toward respective lower jaws to clamp the strip therebetween for a purpose to be described. Additionally, carriage 12 is carried by the base 10 for movement along the path of strip travel toward and away from carriage 11 for reasons to appear, such movement presently being effectuated by means of fluid cylinders 17 carried by the base on opposite sides of the path of strip travel and connected to the carriage 12. Conversely, carriage 11 is movable transversely of the path of strip travel; i.e., both flatwise and edgewise of the strip, for alignment purposes. Since the structure providing for movement of carriage 12 as above described may be any conventional slide arrangement, such structure will not further be disclosed; however, the structure providing for movement aforesaid of carriage 11 is novel and will later be described in detail.

Turning now to FIGURE 5, it will be noted that lower jaw 15 is fixedly carried by the carriage 12 while upper jaw 16 is secured to a slide 18 which is vertically shiftable relative to the carriage whereby the jaw 16 will be shifted toward and away from the jaw 15. Two sets of means are presently provided for biasing slide 18: One means set comprising relatively low-power high-speed fluid cylinders 19 on opposite sides of the carriage and having their blank ends secured to respective carriage mounted brackets 20 and their piston rods secured to respective slide lugs 21. The other means set aforesaid comprises a plurality, herein shown to be four, of relatively high-power, low-speed fluid cylinders 22 having their blank ends secured to a cross member of the carriage 12 and their piston rods secured to slide 18. The novel mode of operation of cylinders 19, 22 will later be disclosed in detail; accordingly, at the present time, it need only be explained that cylinders 19 are adapted to effect quick shifting of the slide 18 to both open and close the jaws 15, 16 while cylinders 22 are adapted to exert a heavy pressure on the slide 18 to firmly clamp the strip between the jaws.

While not shown in detail, it is to be understood that upper jaw 14 of carriage 11 is carried by a slide 118 which may be identical to slide 18. Also, low-power, high-speed cylinders 119 may be employed to quickly raise and lower slide 118 while a set of high-power, low-speed cylinders (not shown but similar to cylinders 22) may be operably associated with the slide 118 in the same manner as was hereinabove described with respect to cylinders 22 and slide 18. Brackets 120 and lugs 121 may be identical to the previously described parts 20 and 21 respectively.

With reference to FIGURES 1 and 2, an arm 23 is disposed on the near side of carriage 11 and has one end pivotally connected to the carriage by means of a link 24 pivoted to a bracket 25. Pivoted to an intermediate portion of arm 23 is one end of a link 26 whose opposite end is adjustably pivoted to the carriage at 27. Also pivoted to such intermediate arm portion is a clevis 28 which is secured to the piston rod of a fluid cylinder 29 whose blank end is pivoted to the carriage by means of a bracket 30. Pivoted to the free end of arm 23 is a double-end link 31 whose upper end is pivoted to a link 32 which is in turn pivoted to the arm 23 by means of a link 33. For a purpose to appear, a roller 34 is pivoted to the juncture of links 32, 33 and, in the position of parts shown, bears against the underside of an abutment 35 carried by the bracket 120.

Although not shown, it is to be understood that arm 23 is duplicated on the far side of the carriage 11 as are all of the parts 24 through 35. Moreover, a shaft 36 extends between the arms 23 to insure unitary movement thereof in a manner to appear. Pivoted between the lower ends of the double-end links 31 is a guage bar 37 whose function will later appear. Suffice it to disclose at this time, however, that guage bar 37 in presently supported well above the strip pass line and extends in a direction edgewise of the strip an amount approximately equal to the widest strip width to be accommodated by the apparatus.

With the construction thus far disclosed, operation will be as follows, it being recalled that the apparatus is in its normal at-rest position in FIGURES 1 and 2 with the strip S passing unimpeded between the separated clamping jaws 13, 14 and 15, 16: As the trailing end of the strip being fed passes between the clamping jaws, strip travel will be arrested with the trailing strip end spaced to the right of the gap between the jaw pair 13, 14 and the jaw pair 15, 16. Cylinders 29 will then be actuated to move arms 23 down thus lowering the guage bar 37. Initial movement of the arms 23 will cause the guage bar to swing on its links 31 from the position seen in FIGURE 2 to the position seen in FIGURE 3 wherein it is aligned with the gap between the clamping jaw pairs 13, 14 and 15, 16. This movement of the guage bar occurs since downward movement of the arms 23 away from the abutments 35 permits contraction of the links 32, 33 with the resultant movement of the guage bar to the left. Further downward movement of the guage bar to the position seen in FIGURE 4 disposes the bar between the clamping jaw pairs 13, 14 and 15, 16.

It is an important feature of the invention that while the guage bar 37 is link supported, the arrangement of the arms 23 and the links 24, 26 is such that the free ends of the arms and thus the supported guage bar move in a perfectly rectilinear path. This is in contrast to certain prior art constructions wherein the guage bar is constrained to move in a rectilinear path by means of cooperating slide surfaces which are subject to considerable wear and resulting maintanance.

As the guage bar 37 is moved to the position seen in FIGURE 4, it may, if desired, scrape the adjoining faces of the clamping jaw pairs 13, 14 and 15, 16 in the well-known manner by means of suitable scraping portions (not shown) carried by the bar. Following movement of the bar 37 to the position seen in FIGURE 4 it may, if desired, elevated slightly by the cylinders 29, the bar still remaining between the clamping jaw pairs, to present guaging surfaces for a purpose to appear.

With the guage bar positioned between the clamping jaw pairs, the previously mentioned trailing strip end will be shifted to the left, as illustrated, to abutment with the guage bar. Slide 118 will then be lowered to securely clamp the trailing strip end between the jaws 13, 14. The leading end of another length of strip will then be fed between the jaws 15, 16 in the direction indicated to abutment with the guage bar whereupon slide 18 will be lowered to securely clamp such leading strip end between the jaws 15, 16.

Cylinders 29 will now be actuated to raise the arms 23 and thus the guage bar to the position seen in FIGURE 3 and finally to the position seen in FIGURE 2. As the guage bar is raised to the position seen in FIGURE 3, it will move in a rectilinear path due to the linkage previously described. If desired, carriage 12 may be shifted slightly to the left to facilitate withdrawal of the guage bar from between the clamped, leading and trailing strip ends. When the upwardly moving guage bar and its associated parts reach the position seen in FIGURE 3, rollers 34 will contact the bracket abutments 35. Further upward movement of the arms 23 to the position seen in FIGURE 2 will therefore cause extension of the links 32, 35 and consequent counter-clockwise rotation of the double-end links 31 thus shifting the guage bar to the right and out of alignment with the gap between the jaw pairs 13, 14 and 15, 16 to minimize its exposure to spatter resulting from the about to be described welding operation.

With the guage bar thus retracted, carriage 12 will be shifted to the right by the cylinders 17 to juxtaposition the clamped, leading and trailing strip ends whereupon welding current will be passed between such strip ends until they reach welding temperature. At such time, carriage 12 will be moved further to the right to force the strip ends together and the welding current will be cut off to allow the now welded-together strip ends to cool. Slides 18, 118 may now be elevated to separate the clamping jaws thus freeing the strip for a resumption of travel through the processing line as previously described. Carriage 12 may now be retracted away from carriage 11 to the position seen in FIGURE 2 wherein the apparatus will remain at rest until another weld is to be made.

Since the present apparatus is designed to handle very heavy guage strip material, clamping pressure of the jaw pairs 13, 14 and 15, 16 must be very high to prevent shifting of the strip ends, especially when they are forced together after they have been softened by the passage of welding current therebetween. This requirement, standing alone, is not difficult to meet since, when the jaw pairs are urged together by hydraulic pressure, as herein disclosed, it is only necessary to use sufficiently high hydraulic pressures coupled with large enough bore hydraulic cylinders. Unfortunately, however, large bore hydraulic cylinders require large volumes of fluid and when quick action is required, the fluid volume necessary is far larger than can be economically supplied by presently available hydraulic pressure sources.

In order to solve the problem of quickly shifting slide 18 and of selectively exerting great force thereon, the present apparatus utilizes the previously disclosed lower-power, high-speed cylinders 19 to effect rapid slide movement and the high-power, low-speed cylinders 22 to exert heavy pressure on the slide. The foregoing is accomplished by novel hydraulic circuitry which effectuates a novel flow of hydraulic fluid through and between the cylinders 19 and 22.

Figure 14:
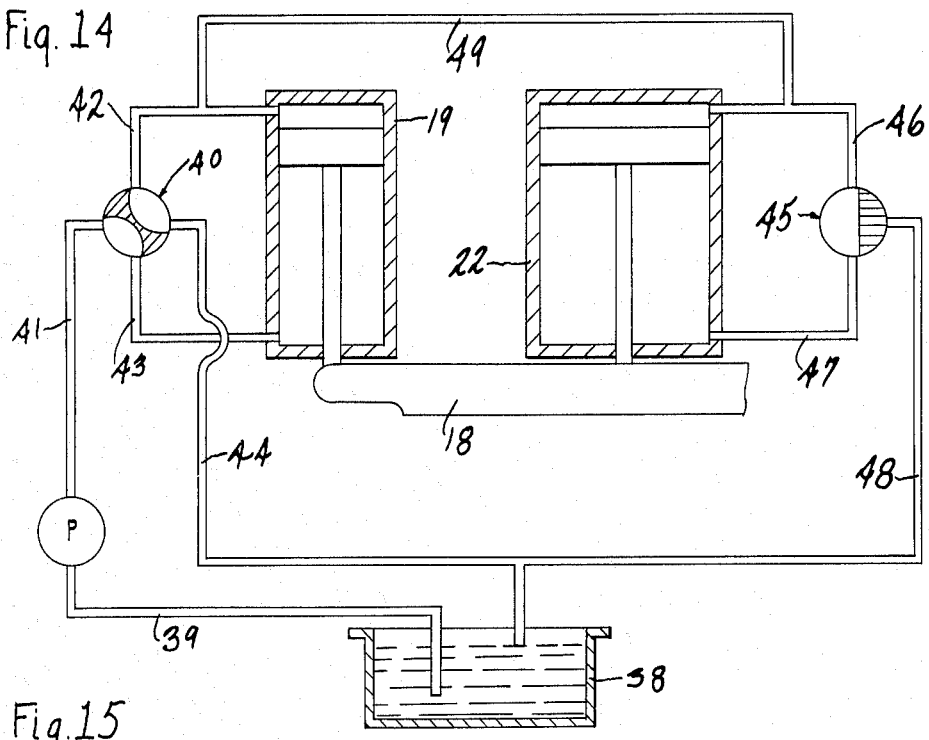

In the position of parts shown in FIGURE 14 and assuming operation of pump P, fluid under pressure will be admitted to the rod end of cylinder 19 through conduit 41, through valve 40, to conduit 43. Since the rod end of cylinder 22 is connected to return conduit 44 through conduit 47, valve 45, conduits 46, 49, 42 and valve 40, and since the blank end of cylinder 22 is connected to such return conduit through conduits 46, 49, 42 and valve 40, and since the blank end of cylinder 19 is connected to such return conduit via conduit 42 and the valve 40, slide 18 will be held in its uppermost position illustrated.

Figure 15:
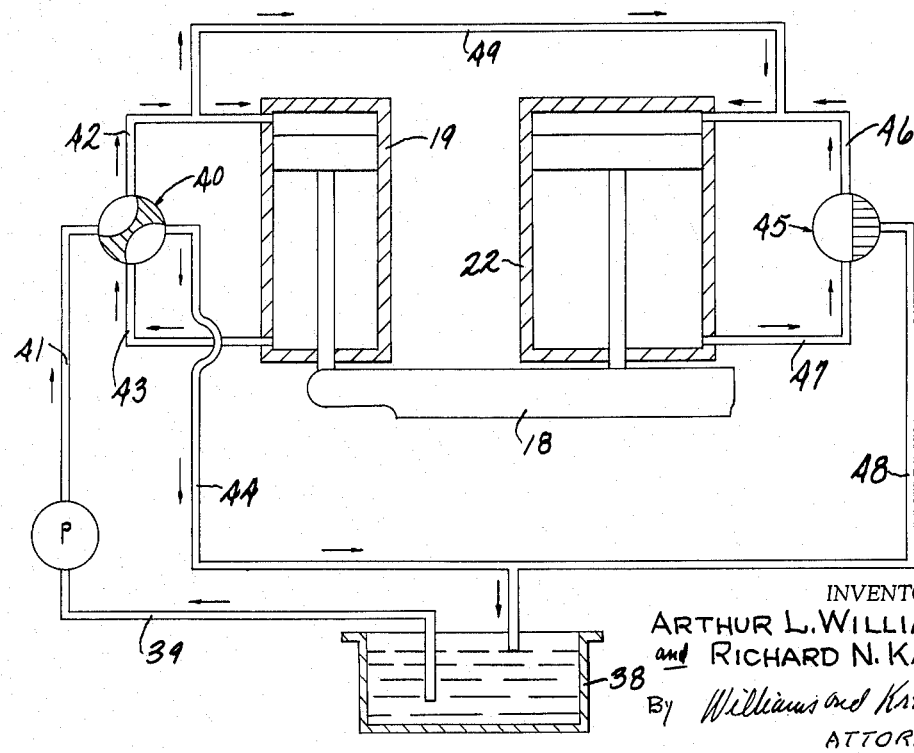

When slide 18 is to be lowered, the actuator of valve 40 will be shifted from the position seen in FIGURE 14 to the position seen in FIGURE 15. This interrupts communication between conduits 41, 43 and conduits 42, 44 and establishes communication between conduits 41, 42 and conduits 43, 44. With conduits 41, 42 in communication, fluid under pressure will be fed to the blank end of cylinder 19 and since fluid at the rod end of this cylinder can escape to the reservoir 38 through the conduit 43, valve 40 and conduit 44, the slide 18 will be quickly moved downwardly. Simultaneously, fluid under pressure will be fed to both the blank and rod ends of cylinder 22; however, since the blank end of cylinder 22 has a greater effective area than its rod end, the blank end of cylinder 22 will also exert a force urging the slide 18 downwardly. During such downward movement of the slide, fluid displaced from the rod end of cylinder 22 will circulate through valve 45 to the blank end thereof. Accordingly, since the volume of fluid displaced from the rod end of cylinder 22 will be less than the volume required at the blank end thereof, such difference in volume will have to be made up by the pump P; however, such volume difference will be relatively slight, being equal only to the cross-sectional area of the piston rod of cylinder 22 multiplied by the working stroke of this cylinder. Therefore, the volume of fluid required from pump P to move the slide 18 down is little more than that required by the blank end of cylinder 19 and since such cylinder is relatively small, such downward movement will be quickly effectuated.

Figure 16:
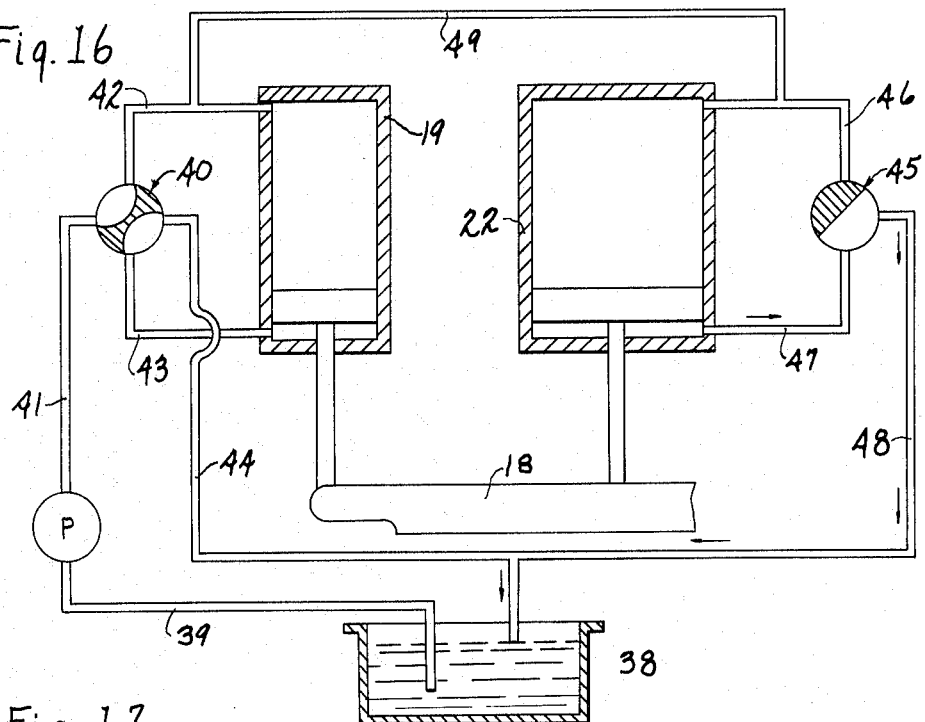

With slide 18 in its full down position, valve 45 will be shifted from the position seen in FIGURE 15 wherein conduits 46 and 47 are in communication with each other but are closed off from conduit 48 to the position seen in FIGURE 16 wherein conduits 47, 48 are in communication with each other but are closed off from conduit 46. In this position of valve 45, fluid pressure at the rod end of cylinder 22 will be released to the reservoir 38 while at the same time, full pressure from pump P will be developed at the blank end of cylinder 22. Accordingly, cylinder 22 will develop its full downward force on the slide 18 to effectuate maximum clamping pressure on the strip.

Figure 17:
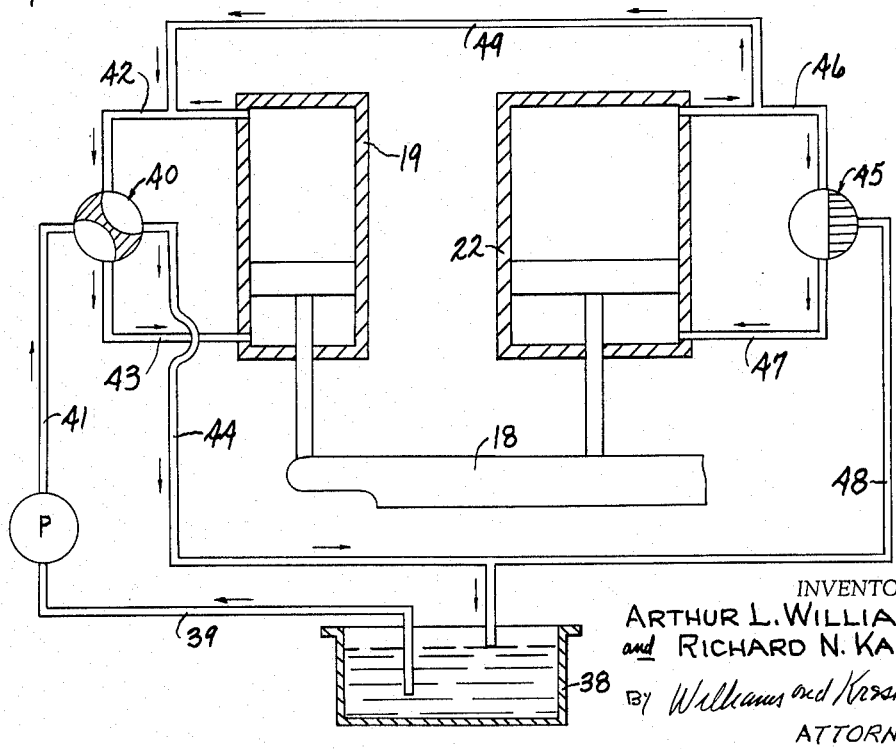

When slide 18 is to be elevated to unclamp the strip, valves 40 and 45 will be shifted to the positions seen in FIGURE 17. With the valves thus positioned, fluid under pressure will flow from pump P to the rod end of cylinder 19 through conduit 41, valve 40 and conduit 43 thus quickly elevating the slide 18 since the fluid at the blank end of cylinder 19 will be returned to reservoir 38 through the conduit 42, the valve 40 and the conduit 44. Elevation of slide 18 will, of course, effect elevation of the pistons of cylinder 22 thus displacing fluid from the blank end of such cylinder and, to prevent the development of a low pressure area at the rod end of cylinder 22, the fluid displaced from the blank end thereof is conducted to the rod end thereof via conduit 46, valve 45 and conduit 47. Since the volume of fluid displaced from the blank end of cylinder 22 is greater than that which is required to be admitted to the cylinder rod end, the excess fluid will be returned to the reservoir 38 via the conduits 49, 42, valve 40 and conduit 44. With the slide 18 fully elevated, all parts will remain in the position seen in FIGURE 14 until such time as the slide is again to be lowered.

Means are provided by each carriage structure 11, 12 to insure proper edge-to-edge relationship of the leading and trailing strip ends before welding. Since, however, identical means are provided by each carriage assembly, only that associated with carriage 12 will be illustrated and described in detail.

With reference to FIGURES 9 and 10, a frame structure 50 extends between and is supported by carriage side members 12.1 above the line of strip travel. Slidably carried by frame 50 (FIGURE 10) in opposed relation are racks 51, 52 which are movable in a direction edgewise of the strip. A gear 53 is rotatable about a shaft 54 affixed to the frame 50 and such gear is meshed with respective racks 51, 52 whereby the racks are interconnected for simultaneous movement in opposite directions. Rack 51 has an upwardly projecting abutment 55 (FIGURE 9) to which is affixed the piston rod 56 of a fluid cylinder 57 mounted on the frame structure.

Depending from racks 51, 52 are respective fingers 58, 59 which are adapted to engage respective edges of the strip. Fingers 58, 59 carry respective limit switches 58.1, 59.1 whose function will later appear, each switch having an actuator so positioned that it will be engaged by a respective strip edge upon movement of the fingers toward each other. Completing the means for properly relating the leading and trailing strip edges is a limit switch 60 having an actuator adapted to be engaged with a cam 61 carried by finger 58 upon movement of the latter in a direction away from the strip edge.

Still referring to FIGURES 9 and 10, and with the structure thus far described, it will be assumed that the leading end of the strip S has been entered into the apparatus between the open jaw pair 15, 16 to abutment with the guage bar 37 as previously described. It will also be assumed that the strip end is offset to one side, as seen in FIGURE 9, with its center located at A rather than at B which is the center of the apparatus.

If fluid under pressure is now admitted to cylinder 57 in manner to retract the piston rod 56, rack 51 (FIGURE 10) will be moved to the right along with its attached depending finger 58. Simultaneously with rack 51, rack 52 will be moved to the left together with its finger 59 because of the interengagement of gear 53 with the racks. Accordingly, fingers 58, 59 will move toward each other at the same rate from the position seen in FIGURE 9 to the position seen in FIGURE 12.

With the parts positioned as seen in FIGURE 12, it will be noted that finger 59 has engaged the right edge of the strip end; however, since the strip is offset to the right, finger 58 is still spaced from the left strip edge. Continued movement of the fingers toward each other will shift the strip end to the left, as seen in FIGURE 13, until the strip is gripped between the fingers 58, 59 with the center A of the strip coinciding with the center B of the apparatus. Thus, the strip is effectively centered. Obviously, the strip will be centered in a similar manner if it is initially offset to the left rather than to the right as herein illustrated.

Following centering of the strip, the latter will be clamped between the jaw pair 15, 16 as previously described whereupon the cylinder 57 may be actuated to extend its piston rod 56 thus returning both fingers to the position seen in FIGURE 9.

It is an important feature of the present invention that means are provided to prevent excess movement of the fingers 58, 59 toward each other which might injure the strip edges. To provide for the foregoing, the switches 58.1, 59.1 are arrange in a control circuit illustrated in FIGURE 11. In this figure, a solenoid valve V may have an inlet conduit 62 connected to a source of pressurized fluid, an exhaust conduit 63, and outlet conduits 64, 65 connected to respective ends of cylinder 57. The electromagnetic actuator of valve V may have connection with a power line L–1 through a circuit 66 and with a power line L–2 through circuits 67, 68. As will later appear, energization of the actuator of the valve through circuits 66, 67 will so shift the internal valve parts that fluid pressure will cause retraction of the piston rod 56 of cylinder 57. On the other hand, energization of the actuator of the valve through 66, 68 will so shift the internal valve parts that fluid pressure will cause extension of the piston rod 56.

Completing the circuit diagram seen in FIGURE 11, the previously mentioned switch 60 has its contacts interposed in the circuit 68, such contacts presently being held open since cam 61 is engaged with the actuator of switch 60 (FIGURE 9). In series with switch 60 are the presently closed contacts 69.1 of a switch 69. In parallel relation in circuit 67 are the previously mentioned limit switches 58.1, 59.1 and, in series with such switches, are the presently open contacts 69.2 of the switch 69.

When piston rod 56 is to be retracted to move the previously mentioned fingers 58, 59 toward each other, switch 69 will be operated to open its contacts 69.1 and close its contacts 69.2. This will energize the actuator of valve V through the presently closed switches 58.1, 59.1 and the circuits 66, 67 to thus cause the valve to admit pressurized fluid to the cylinder 57 through the conduit 64 to restrict the piston rod 56. As the fingers 58, 59 move toward each other, the latter finger will first engage the strip edge as seen in FIGURE 12 thus opening the contacts of switch 59.1. However, current will still continue to flow uninterruptedly through circuits 66, 67 thus continuing to move the fingers toward each other since the contacts of switch 58.1 remain closed until such time as finger 58 engages the strip. Upon engagement of finger 58 with the strip as shown in FIGURE 13, the contacts of switch 58.1 will open to de-energize the valve actuator thus interrupting fluid flow through conduit 64 to consequently terminate movement aforesaid of the fingers 58, 59.

After the strip is centered and it is desired to shift the fingers 58, 59 away from respective strip edges, switch 69 will be operated to open its contacts 69.2 and close its contacts 69.1. Since the contacts of switch 60 will a this time be closed as a result of the movement of cam 61 away from the actuator of switch 60, the actuator of valve V will be energized through the circuits 66, 68. This will cause the valve to admit pressurized fluid to the cylinder 57 through the conduit 65 thus extending its piston rod and moving the fingers 58, 59 away from each other. Such movement of the fingers will continue until such time as the cam 61 opens the contacts of switch 60 to interrupt current flow in circuits 66, 68 thus de-energizing the actuator of the valve and leaving the parts in the position shown in FIGURES 9 and 11.

Since speed is essential in apparatus of the present type, it is undesirable to separate the fingers 58, 59 as far as seen in FIGURE 9 when relatively narrow strip is to be welded since needless time would be wasted while the fingers 58, 59 move toward each other a considerable distance to engage respective strip edges. Accordingly, it is contemplated that the fingers will normally be separated only far enough to provide working clearance for the strip. To carry out the foregoing and although not shown, any suitable means may be provided to permit ready relocation of switch 60 at various positions along the frame structure 50 as indicated by the phantom-line switch positions seen in FIGURE 9. Accordingly, since movement of the fingers away from each other is interrupted by engagement of cam 61 with the actuator of switch 60, disposition of this switch at, for example, one of the phantom-line positions will interrupt movement of the fingers in a direction away from each other before such fingers bcome separated as widely as shown in FIGURE 9.

Since, as earlier mentioned, strip centering structure similar to that illustrated in FIGURES 9 and 10 will be carried by the carriage structure 11 to center the trailing strip end, a disclosure of each structure would be merely repetitious and is thus omitted.

As earlier mentioned, means are provided for aligning the jaw pairs 13, 14 and 15, 16 with each other and referring to FIGURES 6 through 8, each side of base 10 carries an elongated, vertically extending key 70 and each carriage side member 11.1 provides two elongated ribs 71 generally coextensive with the keys and spaced apart to closely but slidably receive respective keys therebetween (see especially FIGURE 7). The arrangement of parts is such that carriage 11 is permitted both vertical movement relative to the base 10 and horizontal movement relative thereto in a direction edgewise of the strip.

For supporting the slide 11, the lower portion of each side member 11.1 thereof is presently provided with a horizontally extending opening 72 (FIGURE 8) in which a block 73 is slidable. For a purpose to appear, each block is provided with horizontally spaced circular recesses 74 for closely but rotatably receiving respective disk-like members 75. Each disk-like member 75 may be confined in its recess by a retainer 76 and it is secured to or formed integrally with a shaft 77 rotatably supported by the adjoining base wall. As viewed in FIGURE 8, it is important that each member 75 be eccentric with its shaft 77 and that both be offset from their shafts, as shown, in the same direction. Each shaft 77 projects through the wall of the base 10 and to its protruding end is affixed an arm 78 and such arms, as seen in FIGURE 1, are adapted to be orientated in the same direction.

Extending between adjoining arms 78 and pivotally secured to their free ends is an externally threaded link 79 which passes through an enlarged aperture in an upstanding rib 80 on the exterior of the base wall. Nuts 81 may be threaded on the link 79 and be engaged with opposite sides of rib 80 to prevent rotation of arms 78 and consequent rotation of shafts 77 with their eccentric disks 75. As illustrated in FIGURE 6, the hereinabove described structure which includes the block 73, the shafts 77, the eccentric members 75, the arms 78, the link 79 and etc., is duplicated on opposite sides of the base 10 for reasons to appear.

In the event it is necessary to raise the carriage structure 11, the shafts 77 on each side of the carriage 11 need only be rotated a sufficient amount and in the proper direction to elevate the carriage by virtue of rotation of the eccentrics 75 and consequent elevation of the blocks 73. Shaft rotation, of course, readily being effectuated by loosening the lock nuts 81 on the links 79 and shifting the latter to rotate the arms 78 and the attached shafts. Following elevation of the carriage the requisite amount, lock nuts 81 will again be tightened against respective ribs 80 to preserve the adjustment.

Quite obviously, lowering of the carriage 11 will be effectuated in a similar manner, the shafts 77 only being rotated in the opposite direction from that required to raise the carriage. In the event only one side of the carriage is to be shifted, as when respective carriage jaw pairs are for some reason tilted relative to each other, only one of the previously described pairs of shafts 77 need be rotated to either raise or lower the one carriage side on which they are located.

Still referring to FIGURE 6, means are provided for shifting the carriage structure 11 in a direction edgewise of the strip and as herein shown, a fluid cylinder 82 may be affixed to one of the walls of base 10 and have its piston rod 83 extending through a vertically elongated opening 84 in the adjoining carriage wall 11.1. Washer-like members 85 may be suitably affixed to the piston rod 83 on opposite sides of the carriage wall aforesaid to provide abutments.

When it is desired to shift the carriage 11 in a direction edgewise of the strip, it is only necessary to admit fluid under pressure to one end or the other of cylinder 82 depending upon the direction it is desired to shift the carriage. Admission of fluid to the cylinder 82 will shift its piston rod 83 and, through the affixed washer-like rod shoulders 85, such shifting movement will be transmitted to the carriage. As a result of the elongation of slot 84, it will be apparent that the piston rod 83 will in no way interfere with the previously described vertical shifting of the carriage 11 by rotation of shafts 77.

In view of the foregoing it will be apparent to those skilled in the art that we have accomplished at least the principal object of our invention and it will also be apparent to those skilled in the art that the embodiment herein described may be variously changed and modified, without departing from the spirit of the invention, and that the invention is capable of uses and has advantages not herein specifically described; hence it will be appreciated that the herein disclosed embodiment is illustrative only, and that our invention is not limited thereto.

We claim:
1. Apparatus for welding two metal strips in end-to-end relation, comprising a pair of supports, two pairs of strip clamping jaws, each pair being operable to clamp a respective strip therebetween and each pair being mounted on a respective support, one support for one pair of jaws being movable along a horizontal path toward and away from the other support so that the spacing between the clamped strip ends may be varied, an arm pivotally mounted on one of said supports, a gauge bar pivotally depending from said arm, and link means constraining said gauge bar to vertical movement along a rectilinear path to a lowered position wherein said gauge bar is disposed between said clamped strip ends to establish a predetermined spacing therebetween and to an upper position wherein said gauge bar is disposed above said clamped strip ends for non-interference with the welding of said strip ends.

2. The construction of claim 1 wherein a link has one end pivotally connected to the upper portion of said gauge bar and the other end pivotally connected to said arm adjacent to its pivot connection with said gauge bar, and means for rotating said link about its pivot to said arm when said gauge bar is in its upper position to move said gauge bar horizontally toward a surface of said one support.

3. The construction of claim 1 wherein a vertically arranged double end link is pivoted to said arm, the lower end of said link being pivotally connected to the upper portion of said gauge bar, and means for moving the upper end of said link to rotate the latter about its pivot to said arm when said gauge bar is in its upper position to move said gauge bar horizontally toward a surface of said one support.

4. The construction of claim 1 wherein a vertically arranged double end link is pivoted to one end of said arm, the lower end of said double end link being pivotally connected to the upper portion of said gauge bar and further including a pair of angularly related links having common ends pivoted together, the free end of one link being pivotally connected to the upper end of said double end link and the free end of the other link being pivotally connected to said arm inwardly of said one arm end, a roller on the pivot between the common ends of said angularly related links, and abutment means engaged by said roller when said gauge bar is in its upper position to change the angularity between said angularly related links and thereby cause rocking movement of said double end link about its pivot to move said gauge bar horizontally toward a surface of said one support.

5. Apparatus for welding two metal strip ends in end-to-end relation, comprising a pair of supports, two pairs of strip clamping jaws, each pair being operable to clamp a respective strip therebetween and each pair being mounted on a respective support, one support for one pair of jaws being movable along a horizontal path toward and away from the other support so that spacing between the clamped strip ends may be varied, a relatively long arm extending somewhat horizontally along a surface of said one support with one end generally vertically aligned with the welding line between said pairs of jaws and the opposite end of said arm pivoted to a first link which in turn is pivoted to said one support, a gauge bar pivotally depending from said one arm end, a second link having one end pivoted to said one support and its opposite end pivoted to said arm intermediate the ends thereof, said first and second links providing for vertical movement of said one arm end along a rectilinear path to a lowered position wherein said gauge bar is disposed between said clamped strip ends to establish a predetermined spacing therebetween at the weld line and to an upper position wherein said gauge bar is disposed above said clamped strip ends for non-interference with the welding of said strip ends.

6. The construction of claim 5 wherein a third link has one end pivotally connected to the upper portion of said gauge bar and the other end pivotally connected to said one arm end, and means for rotating said third link when said gauge bar is in its upper position to move said gauge bar horizontally toward a surface of said one support.

7. The construction of claim 5 wherein a vertically arranged double end link is pivoted to said one arm end, the lower end of said double end link being pivotally connected to the upper portion of said gauge bar, and further including a pair of angularly related links having common ends pivoted together, the free end of one such link being pivotally connected to the upper end of said double end link and the free end of the other such link being pivotally connected to said arm inwardly of said one arm end, a roller on the pivot between the common ends of said angularly related links, and abutment means engaged by said roller when said gauge bar is in its upper position to change the angularity between said angularly related links and thereby cause rocking movement of said double end link to move said gauge bar horizontally toward a surface of said one support.

8. Apparatus for welding two metal strips in end-to-end relation, comprising support means, a pair of carriages on said support means, a pair of clamping jaws on each carriage for clamping therebetween respective ones of the strips to be welded and holding them in end-to-end relation, one of said carriages having a key and slot connection with said support means, and means for shifting said one carriage in a direction both edgewise and flatwise of the strip, said slot being deep enough to receive said key at varying depths to provide for shifting of said one carriage in one direction, and said key sliding longitudinally in said slot to provide for shifting of said carriage in the other direction.

9. The construction according to claim 8 wherein the means for shifting in said one direction comprises a fluid cylinder carried by said support means, the rod of said cylinder being connected to said carriage, and the means for shifting in said other direction comprising a block slidably mounted in an elongated opening in said carriage, an eccentric working in an opening in said block and means for rotationg said eccentric.

10. Apparatus for welding two metal strips in end-to-end relation, comprising support means, a pair of carriages on said support means, a pair of clamping jaws on each carriage for clamping therebetween respective ones of the strips to be welded and holding them in end-to-end relation, one of said carriages being movably mounted on said support means, and means for moving said one carriage comprising a block slidably mounted in an elongated opening in said one carriage, an eccentric working in an opening in said block, and means carried by said support means for rotating said eccentric.

11. For use with welding or like apparatus in the processing of a pair of metal strips in end-to-end relation, comprising means for shifting one strip edgewise for predetermined alignment with the other strip, said means including a pair of fingers respectively engageable with opposite edges of said one strip and operable to shift said one strip edgewise, said fingers being mounted for movement toward and away from each other, each finger having an actuator of a control device disposed for engagement with the adjoining strip edge, and means for moving said fingers toward each other, said control devices being disposed in a circuit to control operation of said finger moving means.

12. The construction of claim 11 wherein said control devices are disposed in a parallel circuit to provide for operation of said finger moving means toward each other until both actuators are in engagement with respective opposed edges of said one strip.

13. The construction of claim 12 wherein the actuator of a limit switch is mounted for contact with an abutment on one of said fingers to interrupt movement of said fingers in a direction away from each other.

14. The construction of claim 13 wherein said limit switch is mounted for adjustment toward and away from the crosswise central portion of said one strip.

15. For use with welding or like apparatus in the processing of a pair of metal strips in end-to-end relation, comprising means including a frame structure extending crosswise of the strip, a pair of fingers mounted on said frame for movement toward and away from each other and resepectively engageable with opposite edges of one strip and operable to shift said one strip edgewise for predetermined alignment with the other strip, a pair of gear racks engageable with opposite sides of a common gear so that upon rotation of the latter said racks will be moved in opposite directions in equal amounts, said fingers being connected to respective racks for movement thereby, a fluid cylinder carried by said frame and having its piston rod connected to one of said racks for reciprocating the same and thereby rotating said gear and moving the other rack an equal amount in an opposite direction, each of said fingers having an actuator of a control device disposed for engagement with the adjoining strip edge, said control devices being disposed in a circuit including said fluid cylinder to control operation of the latter.

16. The construction of claim 15 wherein the actuator of a limit switch is mounted for contact with an abutment on one of sai fingers to interrupt movement of said fingers in a direction away from each other.

References Cited by the Examiner

UNITED STATES PATENTS

| | | | |
|---|---|---|---|
| 2,203,151 | 6/1940 | Iversen. | |
| 2,219,049 | 10/1940 | McArthur. | |
| 2,219,493 | 10/1940 | Reed | 113—134 |
| 2,665,555 | 1/1954 | Martinsson | 91—411 |
| 2,743,692 | 5/1956 | Wietzel et al. | 113—134 |
| 2,758,148 | 8/1956 | Seeloff | 219—97 |
| 2,911,515 | 11/1959 | Cooper | 219—79 |
| 3,087,307 | 4/1963 | Faisander | 91—414 |

WHITMORE A. WILTZ, *Primary Examiner.*

CHARLES W. LANHAM, *Examiner.*

M. L. FAIGUS, *Assistant Examiner.*